United States Patent Office 3,520,550
Patented July 14, 1970

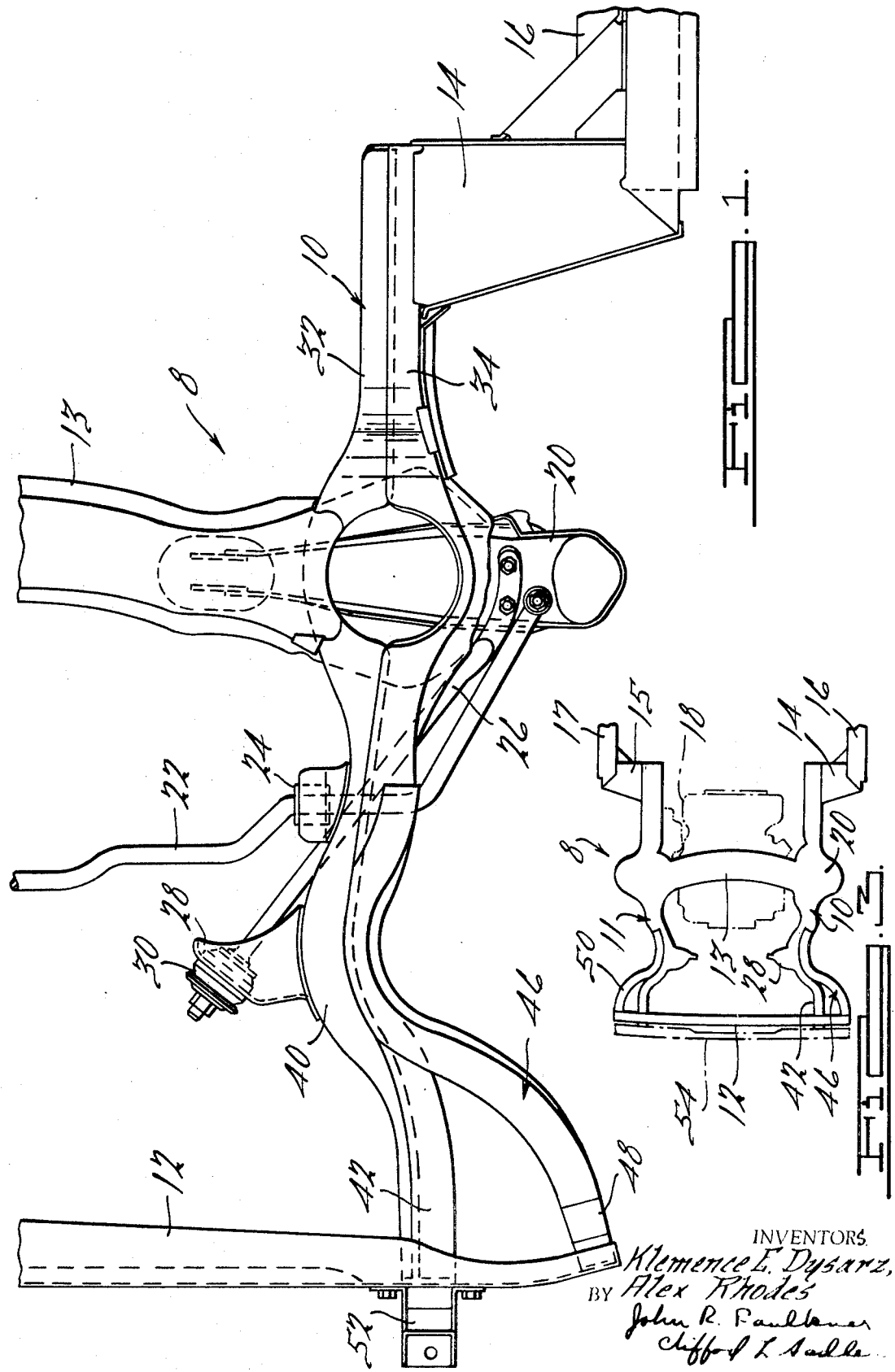

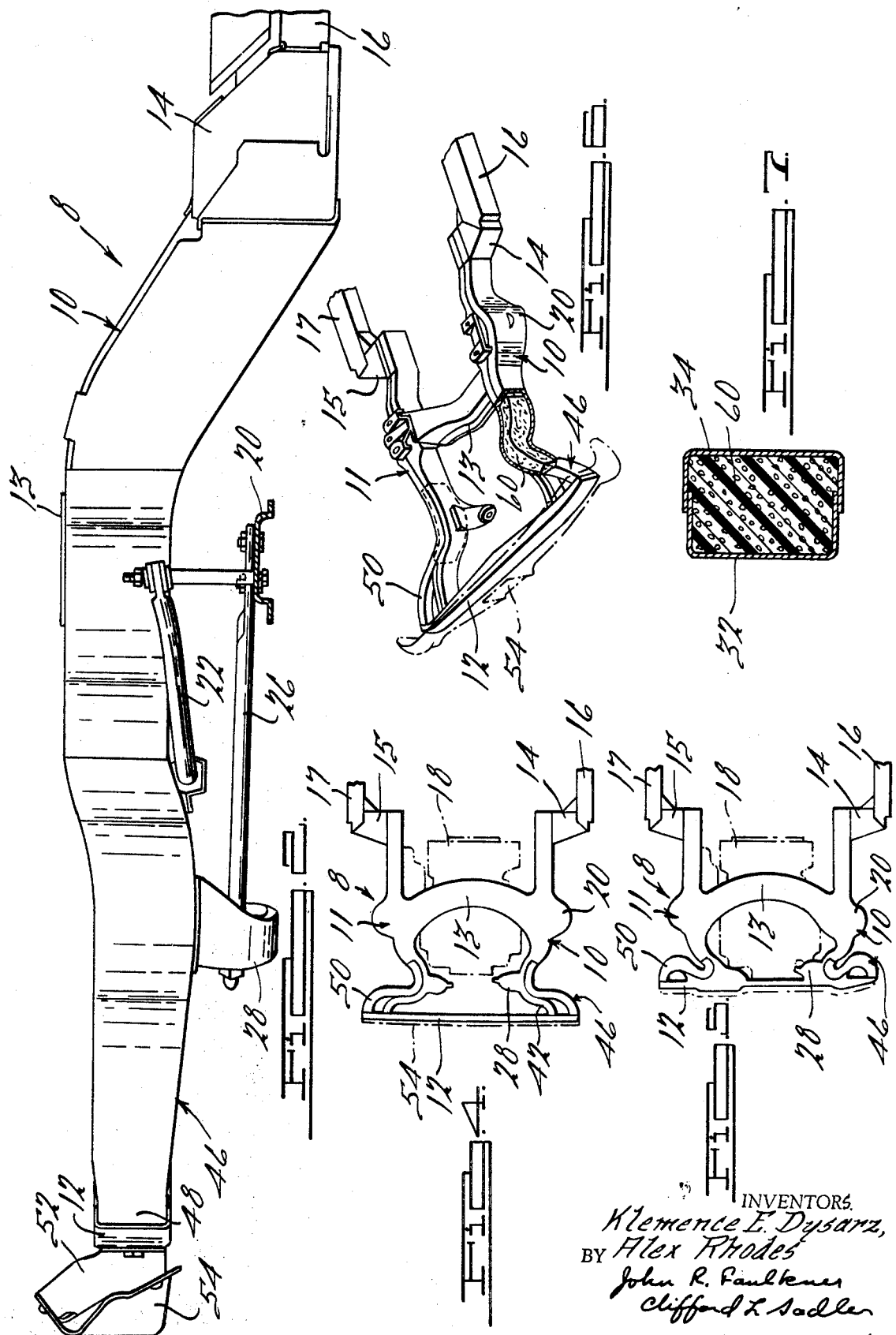

3,520,550
ENERGY ABSORBING STRUCTURE FOR A
MOTOR VEHICLE
Klemence E. Dysarz, Huntington Woods, and Alex
Rhodes, Detroit, Mich., assignors to Ford Motor
Company, Dearborn, Mich., a corporation of Delaware
Filed Jan. 15, 1968, Ser. No. 697,943
Int. Cl. B62d 21/00
U.S. Cl. 280—106                                    10 Claims

ABSTRACT OF THE DISCLOSURE

A frame structure for the chassis of a motor vehicle having a construction designed to dissipate energy by deformation of the frame components. The frame has front side rails that are formed with a generally ogee configuration and a rigid cross member interconnecting the side rails. The cross member is situated directly behind the bumper. The contour of the frame side rails is such as to permit their controlled collapse.

BACKGROUND OF THE INVENTION

The present invention relates to chassis frames for motor vehicles and more particularly to frames that are designed to absorb energy by the controlled collapse or deformation of frame components.

BRIEF SUMMARY OF THE INVENTION

The present invention is directed toward a collapsible frame structure for a motor vehicle that absorbs energy. The present invention provides a vehicle frame having forward side rail members formed in a generally ogee shape with a rigid frame cross member interconnecting the forward ends of the side rails. The frame side rails are extended so that the cross member is situated directly behind the bumper, and thereby provide an increase in crushable length.

BRIEF DESCRIPTION OF THE DRAWINGS

The many objects and advantages of the present invention will become apparent upon consideration of the following discussion and the accompanying drawings, in which:

FIG. 1 is a top plan view of a portion of a vehicle frame structure constructed in accordance with this invention;

FIG. 2 is a side elevational view of the structure disclosed in FIG. 1;

FIGS. 3, 4 and 5 are top plan views of a vehicle having a frame constructed in accordance with this invention and disclosing the progressive deformation of the frame resulting from energy absorption;

FIG. 6 is a perspective view of a frame similar to the one disclosed in FIGS. 1 and 2 and having energy absorbing material inserted in the frame side rails; and FIG. 7 is a sectional view of one of the frame side rails of FIG. 6.

DETAILED DESCRIPTION OF THE INVENTION

Referring now to the drawings, wherein the presently preferred embodiment of the invention is illustrated, FIGS. 1, 2 and 3 disclose a novel frame assembly 8. The assembly 8 includes left and right forward side rails 10 and 11. A forward cross member 12 interconnects the ends of the side rails 10 and 11. A second cross member 13 interconnects the side rails 10 and 11 at a distance spaced rearwardly of the cross member 12. The rear ends of the side rails 10 and 11 are welded to left and right torque boxes 14 and 15, respectively. The torque boxes 14, 15 extend laterally from the ends of the forward side rails 10 and 11 and are welded to the ends of intermediate side rails 16 and 17. The remainder of the frame assembly 8, including the undisclosed portion of the intermediate rails 16 and 17, is of conventional construction.

The vehicle body which accommodates the passengers and driver is supported principally on the intermediate side rail members 16 and 17.

The cross frame member 13 provides a support for the engine 18 as indicated in FIG. 3. It also supports the suspension system. A suspension arm 20 has its inner end pivotally connected to the cross member 13 and its outer end connected to a wheel support member by a ball joint (not shown). An antiroll bar 22 extends between the left suspension arm 20 and a similar arm provided on the right side of the vehicle. The bar 22 is journaled in the frame side rails 10 and 11 such as at 24 in FIG. 1.

A drag strut 26 has its rearward end bolted to the suspension arm 20 and its forward end connected to a bracket 28 secured to the left rail assembly 10. Rubber bushings 30 are provided at the latter connection. The construction of the suspension arm 20, the drag strut 26, the roll bar 22 and the manner in which the engine is supported on the cross member 13 is of reasonably conventional design.

In accordance with the present invention, frame assembly 8 is designed to absorb energy by deflection of its components beyond their elastic limit. For this purpose, the forward side rail 10 has a generally box-shaped cross section formed by a pair of channel-shaped girder members 32 and 34 that are welded together with their side flanges in overlapping relationship. The channel members 32 and 34 extend in a generally straight longitudinal direction forwardly from the torque box 14 to their connection with the second frame cross member 13 where they are contoured to form an upper seat for a coil type suspension spring. The channel members 32, 34 extend forwardly from the cross member 13 to a point adjacent the attachment 24 of the roll bar 22. At this location, the channel members 32, 34 sweep inwardly to form an inwardly bulging curved portion 40. The forward end 42 of the side rail 10 extends forwardly and slightly outwardly from the curved portion 40.

The forward frame cross member 12 extends transversely of the vehicle and is rigidly connected to the forward end 42 of the side rail 10 for the left side of the vehicle and to the forward end of right rail 11. The outer ends of the frame cross member 12 extend past the ends of the rail assemblies 10 and 11.

A left outer frame brace 46 has a generally ogee shape (FIG. 1). Its inner end complements the curved portion 40 of the rail assembly 12 and is secured thereto. The outer end 48 of the brace 46 is welded to the left tip of the cross member 12. In a similar fashion, as seen in FIG. 3, an ogee-shaped brace 50 interconnects the curved portion of right rail assembly 11 with the right outer end of the cross member 12.

Referring to FIG. 2, it is to be noted that the left rail assembly 10 is contoured in the elevational view. Torque box 14 is located at a lower elevation than the portion of the side rail 10 adjacent to its intersection with the frame cross member 13. The forward ends of the side rail 10 and of the brace 46 is disposed at an elevation intermediate that of the torque box 14 and the lateral end of the cross member 13.

The preceding description is concerned principally with the construction of the left forward side rail assembly 10. The construction and configuration of the right forward side rail 11 is similar.

A mounting bracket 52 is secured to the forward cross member 12 adjacent its connection with the forward end 42 of the left rail assembly 12. A similar bracket is provided at the forward end of the right rail 11. A bumper 54 is secured to the bracket 52 for the left side and the bracket for the right side.

OPERATION

The frame assembly 8 is designed to collapse in progressive stages as viewed in FIGS. 3, 4 and 5 for the absorption of energy. FIG. 3 shows the arrangement prior to any deformation. In FIG. 4, the bumper 54 has been displaced against the frame cross member 12 and the forward side rails 10 and 11 have been buckled inwardly at their curved portions such as portion 40.

When the distance between the cross member 12 and the front of the engine 18 is closed, the buckling of the side rails 10 and 11 is completed. The rail members 10 and 11, although having strong box section construction, have substantial length and an unique contour that will collapse at a progressive rate all the while absorbing energy. In FIG. 5, the frame cross member 12 is positioned against the engine 18 and the forward ends of the side rails 10 and 11 have completely buckled and collapsed.

MODIFICATION

FIGS. 6 and 7 disclose a modification of the invention wherein a foam material 60 such as a rigid plastic foam or a metal foam is situated within the box section of the frame side rails. The frame assembly of FIG. 6 is identical to that of the other figures except for the presence of the foam 60. The foam situated in the curved portion of the rail assemblies 10 and 11 provides additional energy absorbing material.

The foregoing description presents the presently preferred embodiment of this invention. Modifications and alterations may occur to those skilled in the art that will come within the scope and spirit of the following claims.

We claim:

1. An energy absorbing frame assembly for a motor vehicle, said frame assembly being constructed to support a vehicle body, said frame assembly including a pair of side rails extending in a generally longitudinal direction, a first frame cross member extending transversely of said frame, said side rails having their forward ends rigidly connected to said first cross member, a second frame cross member having its ends connected to said side rails and spaced rearwardly of said first cross member, wheel suspension support means connected to said frame assembly adjacent said second cross member, an engine mounting means connected to said second frame cross member, a major portion of each of said side rails between said first and second frame cross members being bulged inwardly, said major portions being constructed to buckle inwardly upon a frontal impact above a preset force level.

2. An energy absorbing frame assembly according to claim 1 and including:
said side rails having box-shaped cross sections, rigid energy absorbing foam disposed within said side rails forwardly of said second cross member, the lateral ends of said first cross member being spaced outwardly of said side rails, left and right brace members interposed between the ends of said first cross member and said major portions of said side rails, said brace members each having a generally ogee shape, a vehicle bumper secured to said frame cross member, said bumper being closely spaced with respect to said frame cross member.

3. An energy absorbing frame assembly for a motor vehicle, said frame assembly being constructed to support a vehicle body, said frame ssembly including a pair of side rails extending in a generally longitudinal direction, a first frame cross member extending transversely of said frame, said side rails having their forward ends rigidly connected to said first cross member, second frame cross member having its ends connected to said side rails and spaced rearwardly of said first cross member, a major portion of each of said side rails between said first and second frame cross members being bulged inwardly, said major portions being constructed to buckle inwardly upon a frontal impact above a preset force level, the lateral ends of said first cross member being spaced outwardly of said side rails, left and right brace members interposed between the ends of said first cross member and said major portions of said side rails, said brace members each having a generally ogee shape.

4. An energy absorbing frame assembly according to claim 3 and including:
wheel suspension support means connected to said frame adjacent said second cross member, a vehicle bumper secured to said first frame cross member, said bumper being closely spaced with respect to said frame cross member.

5. An energy absorbing frame assembly for a motor vehicle, said frame assembly being constructed to support a vehicle body, said frame assembly including a pair of side rails extending in a generally longitudinal direction, a first frame cross member extending transversely of said frame, said side rails having their forward ends rigidly connected to said first cross member, a second frame cross member having its ends connected to said side rails and spaced rearwardly of said first cross member, said side rails having box-shaped cross sections, rigid energy absorbing foam disposed within said side rails forwardly of said second cross member, a major portion of each of said side rails between said first and second frame cross members being bulged inwardly, said major portions being constructed to buckle inwardly upon a frontal impact above a preset force level.

6. An energy absorbing frame assembly according to claim 5 and including:
the lateral ends of said first cross member being spaced outwardly of said side rails, left and right brace members interposed between the ends of said first cross member and said major portions of said rails.

7. An energy absorbing frame assembly for a motor vehicle, said frame assembly being constructed to support a vehicle body, said frame structure including a pair of side rails extending in a generally longitudinal direction, a first frame cross member extending transversely of said frame, said side rails having their forward ends rigidly connected to said first cross member, a chrome plated vehicle bumper secured to said first frame cross member, said bumper being closely spaced with respect to said frame cross member, a second frame cross member having its ends connected to said side rails and spaced rearwardly of said first cross member, a major portion of each of said side rails between said first and second frame cross members being bulged inwardly, said major portions being constructed to buckle inwardly upon a frontal impact above a preset force level.

8. An energy absorbing frame assembly for a motor vehicle, said frame assembly being constructed to support a vehicle body, said frame assembly including a pair of side rails extending in a generally longitudinal direction, a first frame cross member extending transversely of said frame, said side rails being rigidly connected to said first cross member, a second frame cross member having its ends connected to said side rails and spaced rearwardly of said first cross member, wheel suspension support means connected to said frame adjcent said second cross member, a major portion of each of said side rails between said first and second frame cross members being bulged inwardly, said major portions being constructed to buckle inwardly upon a frontal impact above a preset force level.

9. An energy absorbing frame assembly for a motor vehicle, said frame assembly being constructed to support a vehicle body, said frame assembly including a pair of forward side rails having generally longitudinally extending portions, a transversely extending frame cross member interconnecting said longitudinally extending portions, wheel suspension support means connected to said frame assembly adjacent said frame cross member, said side rails each having a girder member situated forwardly of said longitudinally extending portions, said girder members each having a first portion extending forwardly and inwardly of said longitudinally extending portions and a second portion extending forwardly and outwardly of said first girder member portion, said second girder member portions having forward ends situated laterally outwardly of said longitudinally extending portions, another transversely extending frame cross member interconnecting said side rails forwardly of said first mentioned frame cross member, said girder members being constructed to buckle upon a frontal impact above a preset force level.

10. An energy absorbing frame assembly for a motor vehicle, said frame assembly being constructed to support a vehicle body, said frame assembly including a pair of forward side rails having generally longitudinally extending portions, a transversely extending frame cross member interconnecting said longitudinally extending portions, wheel suspension support means connected to said frame assembly adjacent said frame cross member, said side rails each having a girder member with a generally ogee shape situated forwardly of said longitudinally extending portions, said girder members each having a first curved portion extending forwardly and inwardly of said longitudinally extending portions and a second curved portion extending forwardly and outwardly of said first curved portion, another transversely extending frame cross member interconnecting said side rails forwardly of said first mentioned frame cross member, said girder members being constructed to buckle upon a frontal impact above a preset force level.

References Cited

UNITED STATES PATENTS

| | | | |
|---|---|---|---|
| 3,129,954 | 4/1964 | Deuro | 280—106 |
| 2,835,506 | 5/1958 | Schilberg | 280—106 |

PHILIP GOODMAN, Primary Examiner